US007287805B2

(12) United States Patent
Yamada et al.

(10) Patent No.: US 7,287,805 B2

(45) Date of Patent: Oct. 30, 2007

(54) VEHICLE DOOR OPENING AND CLOSING DEVICE

(75) Inventors: Katsuhisa Yamada, Toyota (JP); Junji Yamaguchi, Toyota (JP); Seiichi Suzuki, Nishikamo-gun (JP); Joo Young Kim, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 129 days.

(21) Appl. No.: 11/206,072

(22) Filed: Aug. 18, 2005

(65) Prior Publication Data

US 2006/0042168 A1 Mar. 2, 2006

(30) Foreign Application Priority Data

Aug. 26, 2004 (JP) ............................ 2004-247155

(51) Int. Cl.
*B60J 5/06* (2006.01)

(52) U.S. Cl. ........................................ 296/155; 49/360

(58) Field of Classification Search ................ 296/155; 49/352, 362, 349, 348, 138, 502
See application file for complete search history.

(56) References Cited

U.S. PATENT DOCUMENTS

| | | | | |
|---|---|---|---|---|
| 4,640,050 | A * | 2/1987 | Yamagishi et al. | 49/360 |
| 5,138,795 | A * | 8/1992 | Compeau et al. | 49/360 |
| 5,168,666 | A * | 12/1992 | Koura et al. | 49/360 |
| 5,316,365 | A * | 5/1994 | Kuhlman et al. | 296/155 |
| 5,551,190 | A * | 9/1996 | Yamagishi et al. | 49/360 |
| 5,806,246 | A | 9/1998 | Azuma | |
| 5,829,198 | A * | 11/1998 | Watanabe | 49/141 |
| 6,226,925 | B1 * | 5/2001 | Shimura et al. | 49/360 |
| 6,321,489 | B1 * | 11/2001 | Murofushi et al. | 49/360 |
| 6,539,670 | B2 * | 4/2003 | Haag et al. | 49/360 |
| 6,925,757 | B2 * | 8/2005 | Priest et al. | 49/360 |
| 7,134,241 | B2 * | 11/2006 | Suzuki | 296/155 |
| 2004/0195419 | A1 * | 10/2004 | Yamagishi et al. | 49/332 |
| 2004/0216383 | A1 * | 11/2004 | Rogers et al. | 49/360 |
| 2004/0221510 | A1 | 11/2004 | Fukumoto et al. | |
| 2007/0108798 | A1 * | 5/2007 | Nishimura et al. | 296/155 |

* cited by examiner

*Primary Examiner*—Kiran B. Patel
(74) *Attorney, Agent, or Firm*—Bushanan Ingersoll & Rooney PC

(57) ABSTRACT

A vehicle door opening and closing device includes a guide rail fixed to a vehicle body, a supporting member connected to the vehicle door, a first driven pulley, a second driven pulley, an idle pulley, a cable take-up pulley that is arranged between the idle pulley and the second driven pulley, a cable wound around the cable take-up pulley and made contact with the idle pulley, the first driven pulley, and the second driven pulley, and a pulley cover for guiding a first portion of the cable connected to the supporting member to be made contact with the idle pulley in such a manner that a vertical position of the first portion of the cable is different from that of a second portion of the cable in contact with the idle pulley.

10 Claims, 5 Drawing Sheets

VEHICLE DOOR OPENING AND CLOSING DEVICE

CROSS REFERENCE TO RELATED APPLICATIONS

This application is based on and claims priority under 35 U.S.C. § 119 to Japanese Patent Application 2004-247155, filed on Aug. 26, 2004, the entire content of which is incorporated herein by reference.

FIELD OF THE INVENTION

This invention generally relates to a vehicle door opening and closing device. More particularly, this invention pertains to a vehicle door opening and closing device driven by a cable.

BACKGROUND

A known vehicle door opening and closing device is disclosed in U.S. Pat. No. 5,806,246A. The vehicle door opening and closing device disclosed is a cable-driven type in which a cable is used for a power transmission related to an opening and closing driving of a sliding door. The device disclosed includes a take-up pulley on a lower side of a step panel so as to be rotatably driven by an electric motor, and driven pulleys on front and rear end portions of the lower face of the step panel. Then, two cables whose respective one ends are connected to a portion of a sliding door are in contact with the take-up pulleys.

In the aforementioned structure, when one cable is drawn out while the other cable is taken up, for example, by rotatably driving the cable take-up pulley by means of the electric motor, the sliding door is opened. Meanwhile, when one cable is taken up while the other cable is drawn out, the sliding door is closed.

The aforementioned sliding door is opened or closed since a roller provided on the door is guided onto a guide rail of a guide portion. A front end of the guide rail is bent towards an inner side in the vehicle width direction while a rear end extends in the rearward direction of the vehicle. This is for pushing the sliding door in the vehicle exterior direction immediately after the sliding door is opened from a fully closed state, or pulling the sliding door in the vehicle interior direction immediately before the sliding door is brought in a fully closed state.

According to the sliding door disclosed, when the roller provided on the sliding door passes through the bent portion of the guide rail, an effective length of a path of the cable is significantly changed. Therefore, in order to absorb looseness of the cable in association with change of the effective length, a pulley is provided for tension control in a middle of the path of the cable, thereby requiring a comprehensive structure, increase of the number of parts, and the like.

Thus, a need exists for a vehicle door opening and closing device that can absorb looseness of a cable by a simple structure, and improve reliability of an opening and closing driving of the vehicle door.

SUMMARY OF THE INVENTION

According to an aspect of the present invention, a vehicle door opening and closing device includes a guide rail fixed to a vehicle body and whose front end portion bends via a bent portion towards an inner side in a width direction of a vehicle while whose rear end portion extends in a rearward direction of the vehicle, a supporting member connected to a vehicle door and guided by the guide rail for opening and closing the vehicle door, and a first driven pulley, a second driven pulley, and an idle pulley arranged in the vicinity of the front end portion, the rear end portion, and the bent portion of the guide rail respectively, and rotatably supported on the vehicle body. The vehicle door opening and closing device also includes a cable take-up pulley arranged between the idle pulley and the second driven pulley, and rotatably driven by a driving member fixed to the vehicle body, and a cable wound around the cable take-up pulley and made contact with the idle pulley, the first driven pulley, and the second driven pulley. The cable is connected to the supporting member by means of a spring. The vehicle door opening and closing device further includes a pulley cover for guiding a first portion of the cable connected to the supporting member to be made contact with the idle pulley in such a manner that a vertical position of the first portion of the cable is different from that of a second portion of the cable in contact with the idle pulley.

According to another aspect of the present invention, a vehicle door opening and closing device includes a guide rail fixed to a vehicle body and whose front end portion bends via a bent portion towards an inner side in a width direction of a vehicle while whose rear end portion extends in a rearward direction of the vehicle, a supporting member connected to a vehicle door and guided by the guide rail for opening and closing the vehicle door, and a first driven pulley, a second driven pulley, and an idle pulley arranged in the vicinity of the front end portion, the rear end portion, and the bent portion of the guide rail respectively, and rotatably supported on the vehicle body. The vehicle door opening and closing device also includes a cable take-up pulley arranged between the idle pulley and the second driven pulley, and rotatably driven by a driving member fixed to the vehicle body, a first cable whose first end side is wound around the cable take-up pulley while second end side is connected to the supporting member by means of a first spring and made in contact with the idle pulley and the first driven pulley, the second end side being made contact with the idle pulley when the supporting member is guided by the guide rail to a side of the rear end portion relative to the bent portion, and being separated from the idle pulley when the supporting member is guided by the guide rail to a side of the front end portion relative to the bent portion, and a second cable whose first end side is wound around the cable take-up pulley while second end side is connected to the supporting member by means of a second spring and made in contact with the second driven pulley, the second end side being separated from the idle pulley when the supporting member is guided by the guide rail to a side of the rear end portion relative to the bent portion, and being made contact with the idle pulley when the supporting member is guided by the guide rail to a side of the front end portion relative to the bent portion. The vehicle door opening and closing device further includes a pulley cover for guiding the respective second end sides of the first cable and the second cable to be made contact with the idle pulley in such a manner that vertical positions of the respective second end sides of the first cable and the second cable, and the first end side of the first cable are different from one another. By rotatably driving the cable take-up pulley, the supporting member is guided to a side of the rear end portion of the guide rail as the first cable is drawn out while the second cable is taken up, thereby opening the vehicle door, and the supporting member is guided to a side of the front end portion of the guide rail as the first cable is taken up while the second cable is drawn out, thereby closing the vehicle door.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 6:
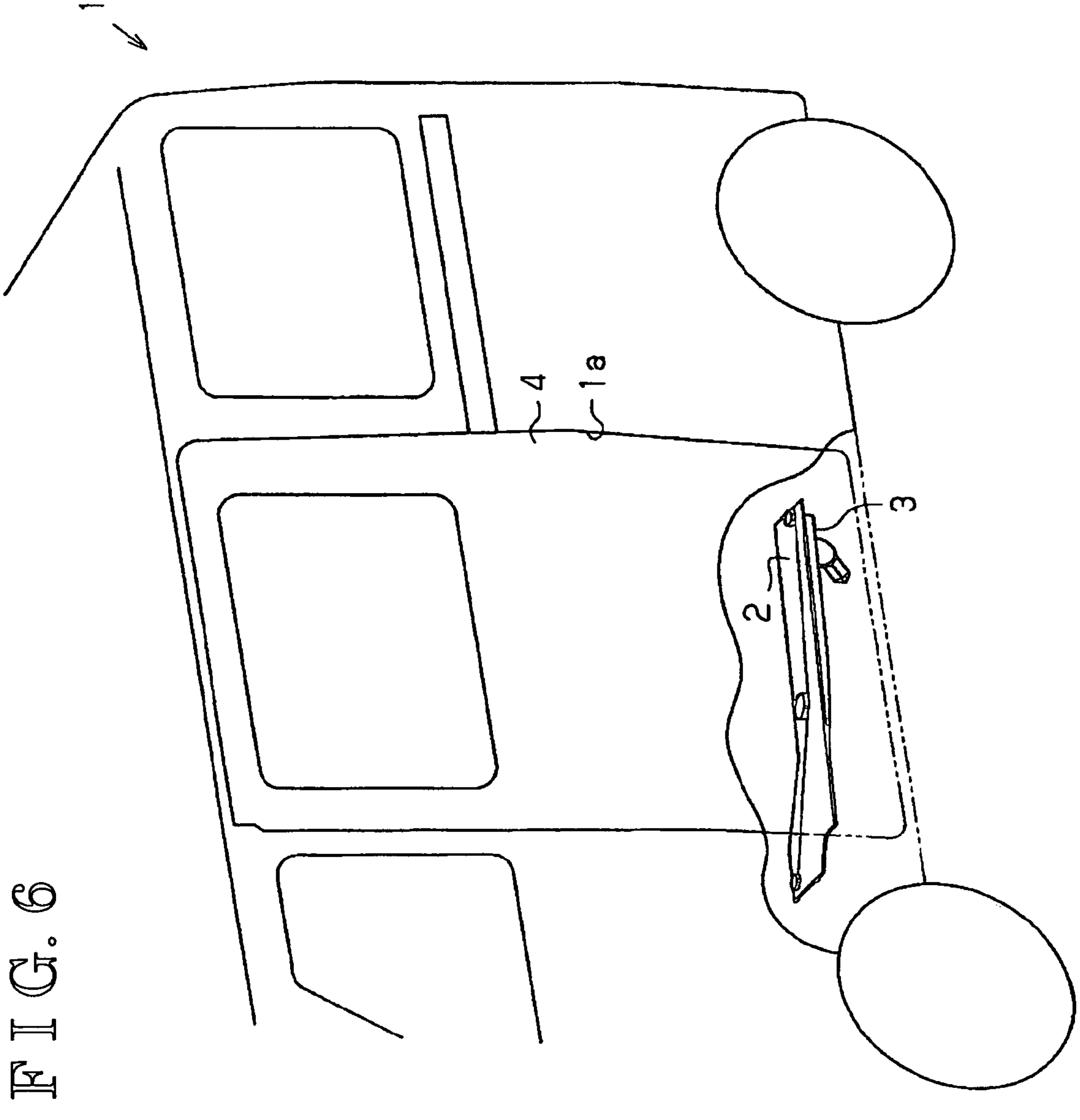
FIG. 6 is a schematic view of a vehicle.

An embodiment of the present invention is explained with reference to the attached drawings. FIG. 6 is a view showing a vehicle such as an automobile in which the present embodiment is employed. A vehicle 1 includes a door opening 1*a* formed on a side portion. Then, a step panel 2 basically extending in a longitudinal direction of the vehicle 1 is arranged and fixed onto a lower side of the door opening 1*a* that constitutes a portion of a vehicle body. The step panel 2 includes a top panel portion, and a sidewall portion downwardly projecting along a periphery of the top panel portion so as to form a box shape.

A lower rail 3 serving as a guide rail basically extending in the longitudinal direction of the vehicle 1 is fixed to a lower face of the step panel 2. That is, the lower rail 3 is fixed to a lower portion of the vehicle 1 by means of the step panel 2. The lower rail 3 is arranged on an outer side in a width direction of the vehicle 1 on the lower face of the step panel 2. The lower rail 3 is provided for opening and closing a sliding door 4 serving as a vehicle door arranged at the door opening 1*a* in a manner to be mentioned later.

Figure 1:
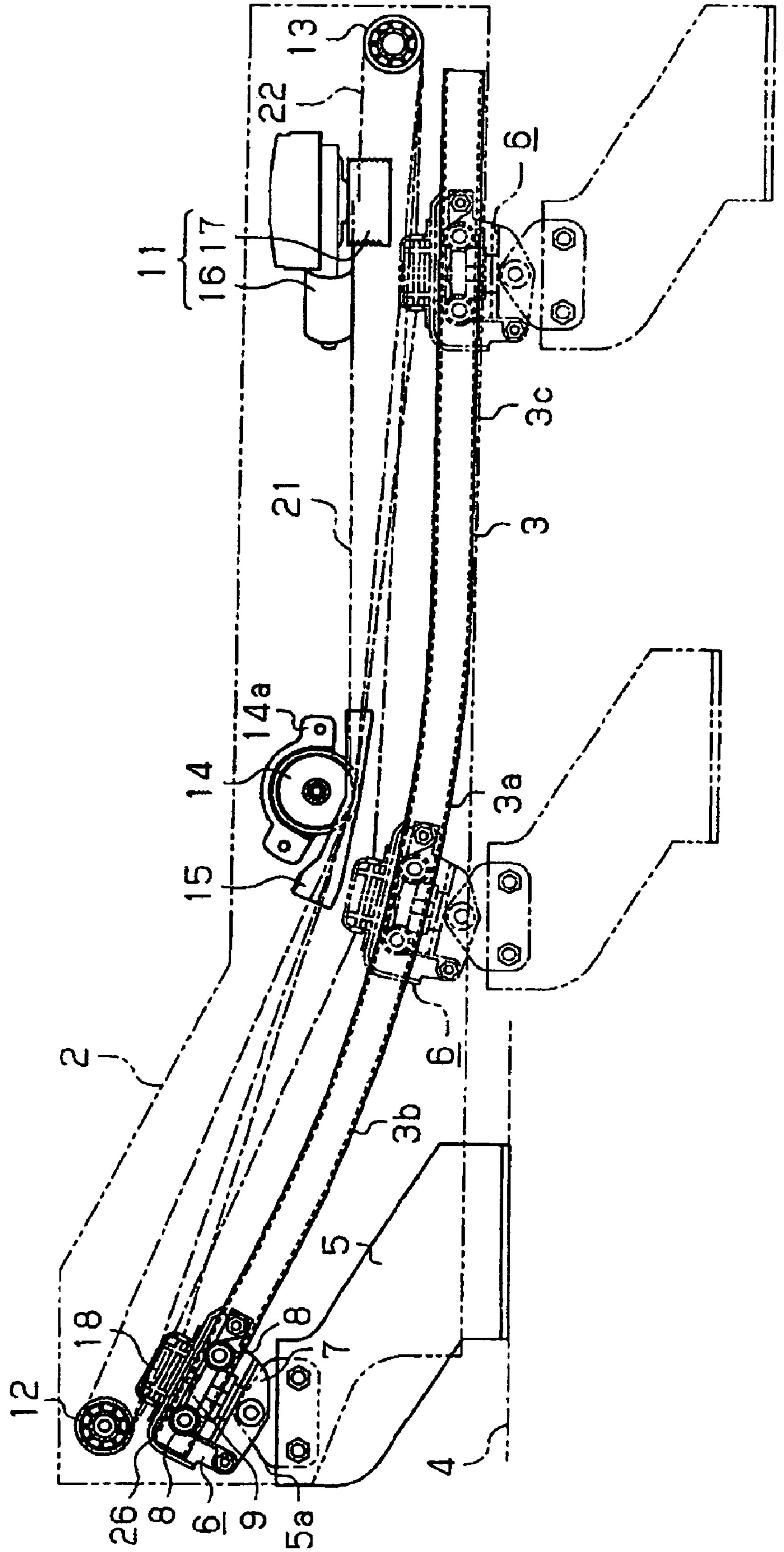
FIG. 1 is a plane view of a vehicle door opening and closing device according to an embodiment of the present invention.

Next, a detailed structure related to an opening and closing driving of the sliding door 4 is explained with reference to FIGS. 1 to 5. FIG. 1 is a plane view showing the step panel 2, the lower rail 3, and the like. In FIG. 1, an upper side corresponds to an inner side in the width direction (i.e. vehicle interior side) of the vehicle 1 while a lower side corresponds to an outer side in the width direction (i.e. vehicle exterior side) of the vehicle 1. In addition, in FIG. 1, a left side corresponds to a front side of the vehicle 1 while a right side corresponds to a rear side of the vehicle 1.

As shown in FIG. 1, the lower rail 3 includes a bent portion 3*a* in a middle portion in the longitudinal direction. Further, the lower rail 3 includes a bending portion 3*b* bending towards the inner side in the width direction of the vehicle 1 on a front end side relative to the bent portion 3*a*, and a linear portion 3*c* extending in a rearward direction of the vehicle 1 on a rear end side relative to the bent portion 3*a*.

Further, an arm 5 projecting in the vehicle interior direction is provided at a lower portion of the sliding door 4. Then, a lower roller supporting member 6 serving as a supporting member is rotatably connected to a door-side bracket 5*a* fixed to a tip end portion of the arm 5.

The lower roller supporting member 6 includes a bracket 7 rotatably connected to the door-side bracket 5*a*, a pair of guide rollers 8 rotatably connected to the bracket 7, and a load roller 9 arranged between the pair of guide rollers 8 and rotatably connected to the bracket 7. The guide roller 8 includes a rotational axis extending to a height direction, i.e. vertical direction, of the vehicle 1. The load roller 9 includes a rotational axis extending in a direction perpendicular to a plane including center axes of the respective guide rollers 8. The lower roller supporting member 6 is supported by the road roller 9 so as to roll on the lower rail 3 in a state in which the pair of guide rollers 8 are able to roll on the lower rail 3.

Accordingly, the sliding door 4 connected to the lower roller supporting member 6 by means of the arm 5 slides in the longitudinal direction of the vehicle 1 for opening or closing the door opening 1*a* since the pair of guide rollers 8 are guided onto the lower rail 3. A load of the sliding door 4 is supported by the load roller 9. The sliding door 4 is pushed to the vehicle exterior side immediately after the sliding door 4 is opened from a fully closed state, or pulled into the vehicle interior side immediately before the sliding door 4 is brought in a fully closed state, for example, when the pair of guide rollers 8 are guided onto the lower rail 3 on the front end side relative to the bent portion 3*a* (i.e. bending portion 3*b*). This is for allowing the sliding door 4 to slide in the rearward direction of the vehicle 1 when the sliding door 4 is opened, and for arranging the sliding door 4 to be positioned in an identical plane with a side face of the vehicle 1 when the sliding door 4 is fully closed.

A mechanism for driving the sliding door 4 to open or close is mounted on the vehicle interior side of the lower rail 3 on the step panel 2. Precisely, a sliding door drive unit 11, a first driven pulley 12, a second driven pulley 13, an idle pulley 14, and a pulley cover 15 are formed on the lower face of the step panel 2. The sliding door drive unit 11 includes a drive motor 16 serving as a driving member fixed to the step panel 2, and a cable take-up pulley 17 connected to an output shaft of the drive motor 16 so as to be rotatably driven thereby.

The first and second driven pulleys 12 and 13 are arranged in the vicinity of front and rear end portions of the lower rail 3 respectively and rotatably supported on the step panel 2. That is, the first and second driven pulleys 12 and 13 are rotatably supported on the lower portion of the vehicle 1 by means of the step panel 2. Further, the first and second driven pulleys 12 and 13 include respective rotational axes extending in the height direction of the vehicle 1 in such a manner that a vertical position of the second driven pulley 13 is greater than that of the first driven pulley 12. The idle pulley 14 and the pulley cover 15 are arranged in the vicinity of the bent portion 3*a* in a manner to be mentioned later. The idle pulley 14 also includes a rotational axis extending in the height direction of the vehicle 1.

Figure 2:
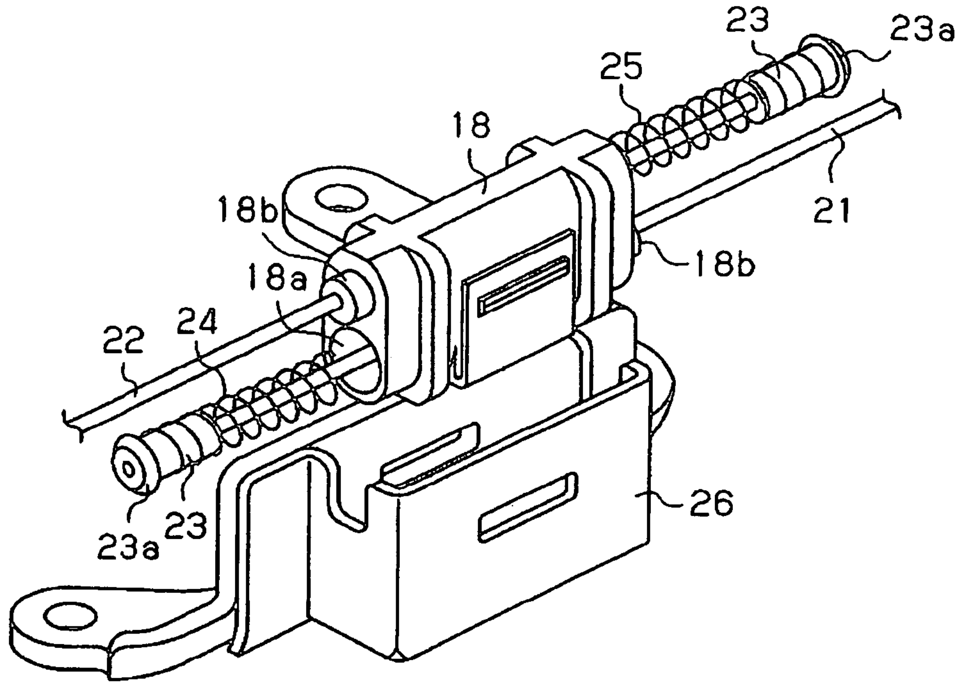
FIG. 2 is a perspective view of the vehicle door opening and closing device according to the embodiment of the present invention.

A cable holder 18 is held on the vehicle interior side of the bracket 7. Respective one ends, i.e. first ends, of a first cable 21 and a second cable 22 are wound around the cable take-up pulley 17 while respective other ends, i.e. second ends of the first cable 21 and the second cable 22 are held by the cable holder 18. Precisely, as shown in FIG. 2, two cable receiving portions 18*a*, whose respective axes extend in parallel to each other in the vehicle height direction, are formed on the cable holder 18. In FIG. 2, one of the cable receiving portions 18*a* is only shown. The respective heights of axes of the lower cable receiving portion 18*a* (i.e. cable receiving portion 18*a* for the first cable 21 shown on a left side in FIG. 2) and the upper cable receiving portion 18*a* (i.e. cable receiving portion 18*a* for the second cable 22) are specified equal to heights of the first driven pulley 12 and the second driven pulley 13. Then, guide pins 23 each serving as a core member and having a smaller outer diameter than an inner diameter of each cable receiving portion 18*a* are fixed to the respective second end portions of the first cable 21 and the second cable 22. Further, flange-shaped retaining portions 23*a* are formed on the respective guide pins 23.

One of the guide pins 23 to which the second end of the first cable 21 is fixed is equipped with a first spring 24 for tension control whose one end engages with one of the retaining portions 23*a*. In addition, the other one of the guide pins 23 to which the second end of the second cable 22 is fixed is equipped with a second spring 25 for tension control whose one end engages with the other one of the retaining portions 23*a*. The first and second springs 24 and 25 are respectively received, together with the corresponding guide pins 23, in the lower cable receiving portions 18*a* and the upper receiving portions 18*a* respectively, in such a manner that the other ends of the first and second springs 24 and 25 engage with an inner wall face of the respective cable receiving portions 18*a*. Further, cylindrical guide portions 18*b* projecting coaxially with the respective cable receiving portions 18*a* are formed on the cable holder 18.

In the aforementioned structure, the second ends of the first and second cables 21 and 22 are inserted into the lower and upper guide portions 18*b* respectively and extend through the inner wall faces of the respective cable receiving portions 18*a*. The second ends of the first and second cables 21 and 22 are fixed to the respective guide pins 23 received in the lower and upper cable receiving portions 18*a* respectively together with the first and second springs 24 and 25 so as to be connected to or held by the cable holder 18. That is, the second ends of the first and second cables 21 and 22 are connected to the lower roller supporting member 6 by means of the first and second springs 24 and 25 respectively.

Accordingly, respective second end sides of the first and second cables 21 and 22 are drawn up or taken up from the respective guide portions 18*b* within a range of elastic deformation of the first and second springs 24 and 25 in the respective cable receiving portions 18*a* so that tension of the first and second cables 21 and 22 are controlled. The cable holder 18 is held by the bracket 7 as a case 26 accommodating therein the cable holder 18 is tightened to the bracket 7. In addition, the guide pins 23 and the like accommodated in the respective cable receiving portions 18*a* are prevented from being pulled out by engaging with an inner wall face of the case 26.

As shown in FIG. 1, the first cable 21 whose second end is held by the cable holder 18 is in contact with the first driven pulley 12 whose height, i.e. in the vehicle vertical direction, is same as that of the axial line of the first cable 21 (i.e. axial line of the lower cable receiving portion 18*a*), and then a direction of the first cable 21 is made changed to a clockwise direction in FIG. 1. The first cable 21 is further in contact with the idle pulley 14 and whose first end is wound around the cable take-up pulley 17 of the sliding door drive unit 11. Meanwhile, the second cable 22 whose second end is held by the cable holder 18 is in contact with the second driven pulley 13 whose height, i.e. in the vehicle vertical direction, is same as that of the axial line of the second cable 22 (i.e. axial line of the upper cable receiving portion 18*a*), and then a direction of the second cable 22 is made changed to a counterclockwise direction in FIG. 1. The first end of the second cable 22 is wound around the cable take-up pulley 17.

In cases where the cable take-up pulley 17 is rotated by driving the sliding door drive unit 11 (precisely, drive motor 16) so that the first cable 21 is drawn out while the second cable 22 is taken up, the cable holder 18 is pulled in the rearward direction of the vehicle 1. At this time, the lower roller supporting member 6 to which the cable holder 18 is fixed is guided in the rearward direction by the lower rail 3, thereby opening the sliding door 4.

Meanwhile, in cases where the cable take-up pulley 17 is rotated by driving the sliding door drive unit 11 so that the first cable 21 is taken up while the second cable 22 is drawn out, the cable holder 18 is pulled in the forward direction of the vehicle 1. At this time, the lower roller supporting member 6 to which the cable holder 18 is fixed is guided in the forward direction by the lower rail 3, thereby closing the sliding door 4.

The second end side of the first cable 21 connected to the lower roller supporting member 6 (precisely, cable holder 18) is made contact with the idle pulley 14 when the lower roller supporting member 6 is guided by the lower rail 3 to the rearward side relative to the bent portion 3*a* (i.e. linear portion 3*c* side). In addition, the second end side of the first cable 21 is separated from the idle pulley 14 when the lower roller supporting member 6 is guided by the lower rail 3 to the forward side relative to the bent portion 3*a* (i.e. bending portion 3*b* side). Meanwhile, the second end side of the second cable 22 is separated from the idle pulley 14 when the lower roller supporting member 6 is guided by the lower rail 3 to the rearward side relative to the bent portion 3*a*. In addition, the second end side of the second cable 22 is made in contact with the idle pulley 14 when the lower roller supporting member 6 is guided by the lower rail 3 to the forward side relative to the bent portion 3*a*. Looseness of the first cable 21 or the second cable 22 caused in case of an opening or closing of the sliding door 4 in association with a change of an effective length of a path of the first cable 21 or the second cable 22 may be absorbed since the tension of the first cable 21 and the second cable 22 is controlled by the first spring 24 or the second spring 25.

Figure 3:
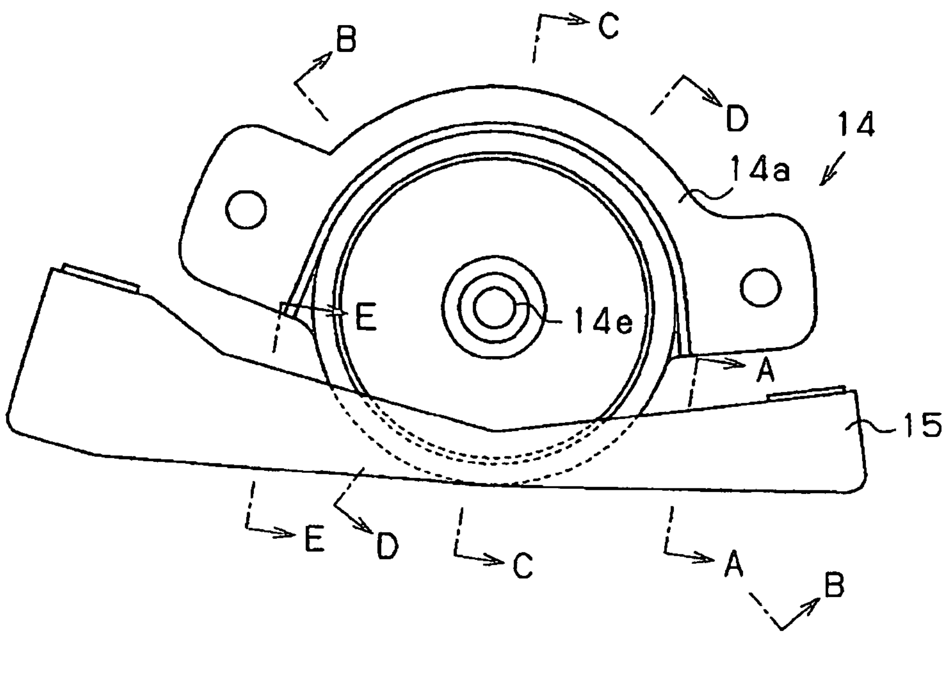
FIG. 3 is a plane view of an idle pulley and a pulley cover according to the embodiment of the present invention.

The idle pulley 14 and the pulley cover 15 are explained in detail in the followings. FIG. 3 is a plane view of the idle pulley 14 and the pulley cover 15. FIGS. 4A, 4B, 4C, 4D and 4E are cross-sectional views taken along the lines A-A, B-B, C-C, D-D, and E-E respectively in FIG. 3. As shown in FIGS. 4A to 4E, the idle pulley 14 according to the present embodiment has a multiple-step (i.e. 3 steps) pulley mechanism. An upper pulley 14*b*, a center pulley 14*c* and a lower pulley 14*d* are arranged on a lower side of a supporting plate 14*a* that is tightened to the lower face of the step panel 2. The upper pulley 14*b*, the center pulley 14*c* and the lower pulley 14*d* overlap each other and are arranged in order from an upper side to a lower side of the vehicle 1. Respective outer diameters of the upper pulley 14*b* and the lower pulley

14*d* are specified equal to each other while an outer diameter of the center pulley 14*c* is specified smaller than that of the upper pulley 14*b* or the lower pulley 14*d*. Vertical positions of the lower pulley 14*d* and the upper pulley 14*b* are specified equal to those of the first and second driven pulleys 12 and 13 respectively, i.e. those of the second ends of the first and second cables 21 and 22 held by the cable holder 18. The upper pulley 14*b*, the center pulley 14*c*, and the lower pulley 14*d* are supported on the supporting plate 14*a* by means of a supporting pin 14*e* penetrating through respective center portions of the upper pulley 14*b*, the center pulley 14*c*, the lower pulley 14*d*, and the supporting plate 14*a*. The center pulley 14*c* is rotatably connected to the supporting pin 14*e* by means of a bearing 14*f*. The upper pulley 14*b* and the lower pulley 14*d* are rotatably connected to the supporting pin 14*e* by means of bushes 14*g* and 14*h* respectively. That is, the idle pulley 14 (i.e. the upper pulley 14*b*, the center pulley 14*c*, and the lower pulley 14*d*) is rotatably supported on the lower portion of the vehicle 1 by means of the supporting plate 14*a* and the step panel 2.

The first cable 21 whose first end side is wound around the cable take-up pulley 17 and which extends towards the first driven pulley 12 is in contact with the center pulley 14*c*. In addition, the second end side of the first cable 21 held by the cable holder 18 is made contact with the lower pulley 14*d* provided at the same vertical position as that of the first cable 21. Meanwhile, the other end side of the second cable 22 held by the cable holder 18 is made in contact with the upper pulley 14*b* provided at the same vertical position as that of the second cable 22.

Figure 4A:
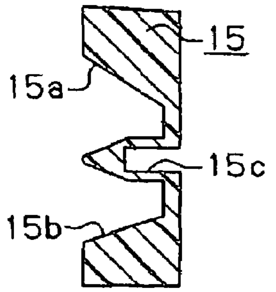
FIG. 4A is a cross-sectional view taken along the line A-A in FIG. 3.
Figure 4E:
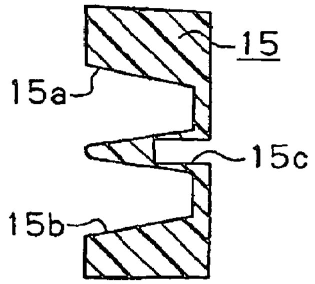
FIG. 4E is a cross-sectional view taken along the line E-E in FIG. 3.
Figure 4B:
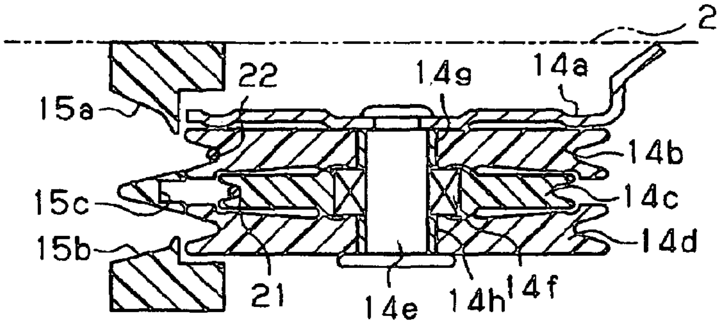
FIG. 4B is a cross-sectional view taken along the line B-B in FIG. 3.
Figure 4C:
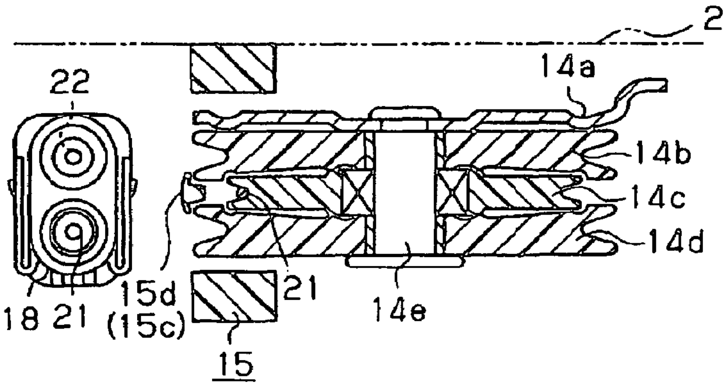
FIG. 4C is a cross-sectional view taken along the line C-C in FIG. 3.

In FIG. 4B, the second end side of the second cable 22 in contact with the upper pulley 14*b* is shown as in a case in which the lower roller supporting member 6 (precisely, cable holder 18) is guided by the lower rail 3 to the forward side relative to the bent portion 3*a*. At this time, the second end side of the first cable 21 is separated from the lower pulley 14*d* as mentioned above. In FIG. 4C, the cable holder 18, and the first and second cables 21 and 22 accommodated in the cable holder 18 are shown as in a case in which the lower roller supporting member 6 is guided by the lower rail 3 in the vicinity of the bent portion 3*a*. At this time, the respective second end sides of the first and second cables 21 and 22 are separated from the lower pulley 14*d* and the upper pulley 14*b*. Further, in FIG. 4D, the second end side of the first cable 21 in contact with the lower pulley 14*d* is shown as in a case in which the lower roller supporting member 6 is guided by the lower rail 3 on the rearward side relative to the bent portion 3*a*. At this time, the second end side of the second cable 22 is separated from the upper pulley 14*b* as mentioned above.

The pulley cover 15 guides the respective second end sides of the first and second cables 21 and 22 that are connected to the lower roller supporting member 6 to be made contact with the idle pulley 14 in such a manner that vertical positions of the second end sides of the first and second cables 21 and 22, and the first cable 21 are different from one another. That is, the pulley cover 15 guides the second end sides of the first and second cables 21 and 22 to be made contact with the lower pulley 14*d* and the upper pulley 14*b* respectively.

As shown in FIGS. 1 and 3, a front end side of the pulley cover 15 (i.e. left side in FIG. 5) is bent inward in the width direction of the vehicle 1 so as to correspond to a path of the first cable 21 extending from the cable take-up pulley 17 to the first driven pulley 12 via the idle pulley 14 (precisely, center pulley 14*c*). Then, as shown in FIGS. 4A and 4E, guide portions 15*a* and 15*b* are formed on a front end portion and a rear end portion in the vehicle longitudinal direction of the pulley cover 15. The guide portions 15*a* and 15*b* are dented from the vehicle exterior side (i.e. left side in FIGS. 4A and 4B) in different vertical positions from each other so as to have a trapezoidal shape. A height of the dent guide portion 15*a*, i.e. a length of a bottom portion of the dent guide portion 15*a* in the vehicle height direction, is specified substantially same as the height of the upper pulley 14*b*. In addition, a height of the dent guide portion 15*b*, i.e. a length of a bottom portion of the dent guide portion 15*b* in the vehicle height direction, is specified substantially same as the height of the lower pulley 14*d*.

Figure 4D:
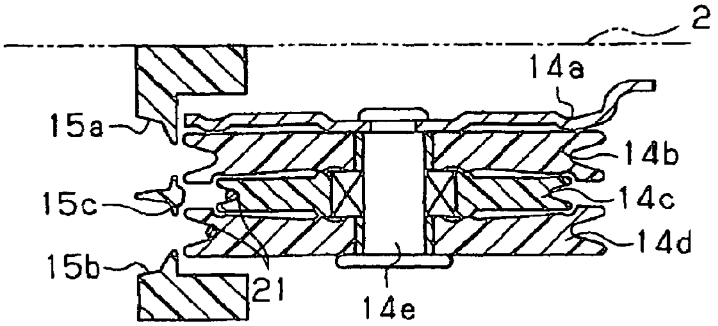
FIG. 4D is a cross-sectional view taken along the line D-D in FIG. 3.

As shown in FIGS. 4B and 4D, the guide portions 15*a* and 15*b* are open towards the idle pulley 14 in a middle portion in the vehicle height direction of the pulley cover 15 so that each opening portion corresponds to a range in which each second end side of the first cable 21 or the second cable 22 is made contact with the lower pulley 14*d* or the upper pulley 14*b*. Particularly as shown in FIG. 4C, outer sides of the guide portions 15*a* and 15*b*, i.e. vehicle exterior sides thereof, in the middle portion of the pulley cover 15 are cut or eliminated such that cut or eliminated portion corresponds to a range in which only the first cable 21 is in contact with the idle pulley 14, i.e. the idle pulley 14 significantly approaches the lower rail 3 (i.e. cable holder 18). This is for preventing the pulley cover 15 from projecting towards the lower rail 3, and for surely avoiding interference between the pulley cover 15 and the lower roller supporting member 6 guided by the lower rail 3.

As shown in FIGS. 4A and 4E, a cover portion 15*c* is formed on each middle portion in the vehicle height direction of the pulley cover 15, i.e. a boundary portion between the guide portions 15*a* and 15*b*. The cover portions 15*c* are respectively formed on the front end portion and the rear end portion of the pulley cover 15, being dented from the vehicle interior side so as to have a rectangular shape. That is, each cover portion 15*c* is formed as a part of the guide portions 15*a* and 15*b*. A height of the dent portion of the cover portion 15*c* is specified substantially the same as that of the center pulley 14*c*. The cover portion 15*c* is provided for covering the first cable 21 in contact with the center pulley 14*c*.

As shown in FIG. 4C, each cover portion 15*c* includes an arc-shaped portion 15*d*, whose thickness is secured in the vehicle interior direction, on the middle portion in the vehicle height direction of the pulley cover 15 so that the arc-shaped portion 15*d* faces the cut or eliminated portion formed on each vehicle exterior side of the guide portions 15*a* and 15*b*. Accordingly, the first cable 21 in contact with the center pulley 14*c* is covered by the cover portions 15*c* over an entire length of the pulley cover 15 while being prevented from projecting towards the lower rail 3 by means of the cover portions 15*c*. Thus, even if the second end side of the first cable 21 or the second cable 22 swings significantly, the first cable 21 or the second cable 22 is prevented from intruding into the center pulley 14*c* to directly interfere with the first end side of the first cable 21 in contact with the center pulley 14*c*. In addition, the first cable 21 in contact with the center pulley 14*c* is prevented from dropping off the center pulley 14*c*.

Figure 5A:
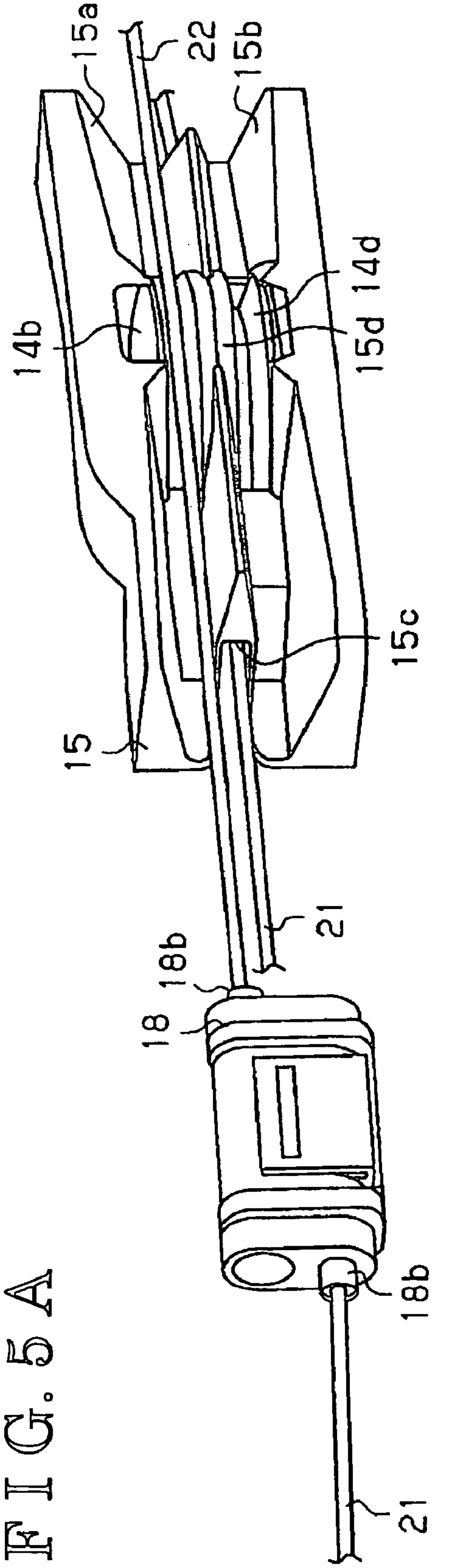
FIG. 5A is a perspective view showing an operation of the vehicle door opening and closing device according to the embodiment of the present invention.

Next, an operation of the present embodiment is explained below. First, in cases where the sliding door 4 is in a fully closed state, the second end side of the second cable 22 connected to the lower roller supporting member 6 is made contact with the upper pulley 14*b* since the lower roller supporting member 6 (i.e. cable holder 18) is guided by the lower rail 3 on the front end side relative to the bent portion 3*a* (i.e. bending portion 3*b* side). At this time, the second end side of the first cable 21 connected to the lower roller supporting member 6 is separated from the lower pulley 14*d*. Then, as shown in FIG. 5A, the second end side of the second cable 22 is made contact with the upper pulley 14*b* by means of the guide portion 15*a* in the opening portion formed in the vertically middle portion of the pulley cover 15.

In such circumstances, when the cable take-up pulley 17 is driven to rotate by means of the drive motor 16 so that the first cable 21 is drawn out while the second cable 22 is taken up, the cable holder 18 is pulled in the rearward direction of the vehicle 1. At this time, the lower roller supporting member 6 to which the cable holder 18 is fixed is guided rearward by means of the lower rail 3, thereby opening the sliding door 4.

Figure 5B:
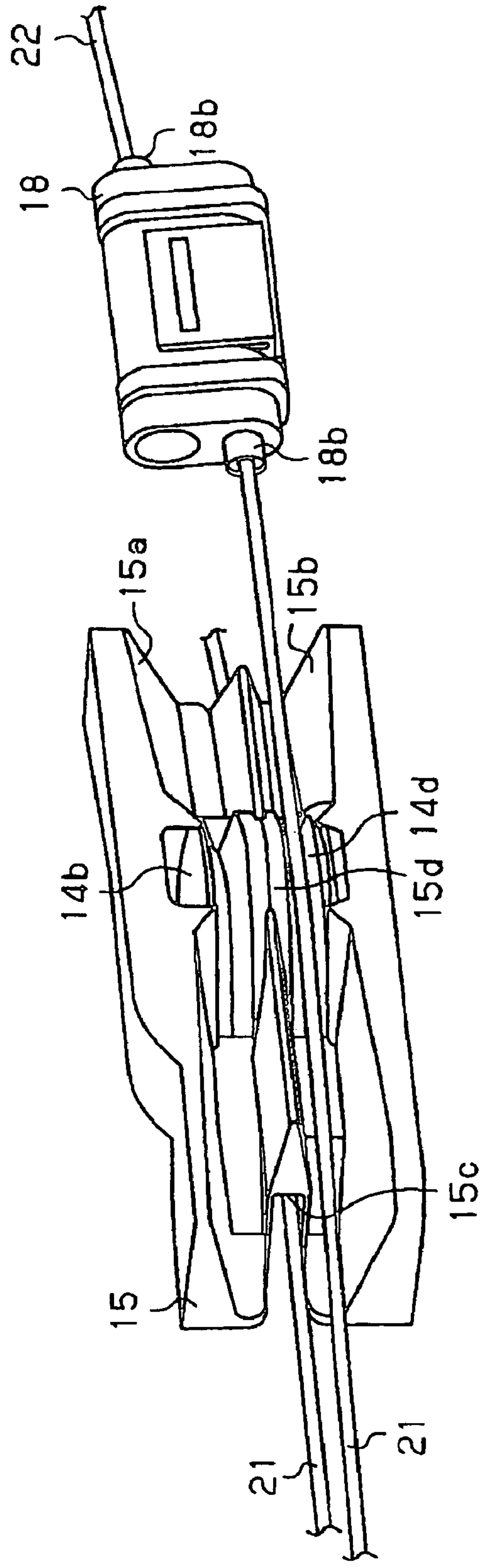
FIG. 5B is a perspective view showing another operation of the vehicle door opening and closing device according to the embodiment of the present invention.

Then, when the lower roller supporting member 6 is guided by the lower rail 3 on the rear end side relative to the bent portion 3*a*, as shown in FIG. 5B, the second end side of the second cable 22 connected to the lower roller supporting member 6 is separated from the upper pulley 14*b* while the second end side of the first cable 21 is guided by the guide portion 15*b* so as to be made contact with the lower pulley 14*d* in the opening portion formed in the vertically middle portion of the pulley cover 15.

When the sliding door 4 is closed from a fully open position in which the lower roller supporting member 6 is positioned at the rear end of the lower rail 3, an operation is performed in a substantially opposite order to the aforementioned operation in which the sliding door 4 is open from a fully closed position, and thus an explanation is omitted.

According to the aforementioned embodiment, looseness of the first cable 21 or the second cable 22 caused in cases where the lower roller supporting member 6 passes through the bent portion 3*a* by means of guiding of the lower rail 3 in association with a significant change of an effective length of a path of the first cable 21 or the second cable 22 may be absorbed since the tension of the first cable 21 or the second cable 22 is controlled by the first spring 24 or the second spring 25. Thus, looseness of the first cable 21 or the second cable 22 may be absorbed by a simple structure, i.e. by the first spring 24 by means of which the second end of the first cable 21 is connected to the lower roller supporting member 6 and the second spring 25 by means of which the second end of the second cable 22 is connected to the lower roller supporting member 6.

The respective second end sides of the first cable 21 and the second cable 22 are guided to the idle pulley 14 so as to contact therewith in such a manner that the second end sides of the first and second cables 21 and 22, and the first end side of the first cable 21, which is in contact with the center pulley 14*c*, do not overlap one another in the vehicle height direction. Therefore, even in case of occurrence of variations in parts, assembly error, or looseness of the first cable 21 or the second cable 22 caused at a sudden reversing of the sliding door 4, the second end side of the first cable 21 or the second cable 22 is prevented from dropping off the idle pulley 14 so as to interfere with peripheral members such as the supporting plate 14*a*, or prevented from overlapping the first cable 21 in contact with the idle pulley 14 so as to interfere therewith, at a time of opening or closing of the sliding door 4. Accordingly, reliability of opening and closing driving of the sliding door 4 may be improved.

Further, according to the aforementioned embodiment, the lower rail 3, the first and second driven pulleys 12 and 13, the idle pulley 14, the drive motor 16, and the pulley cover 15 are arranged on the lower side of the vehicle 1 and all supported on the step panel 2. Thus, if aforementioned parts including the first and second cables 21 and 22 are assembled to the step panel 2 beforehand, unitization of the vehicle door opening and closing device as a whole may be realized. The unitization of the entire device may facilitate assembly operation of the device to the vehicle 1.

Particularly, in cases where the entire device is constituted as a unit that can be easily assembled afterwards, requirements of an option for switching a manual opening and closing device to an automatic opening and closing device, for example, may be easily responded. Further, removing operation of the device at a time of repairing and the like may be facilitated.

Furthermore, according to the aforementioned embodiment, the cable take-up pulley 17 is arranged such that the rotational axis thereof extends in the width direction of the vehicle 1, which may reduce a space of the lower portion (i.e. step panel 2) of the vehicle 1 as compared to a case in which the rotational axis is arranged extending in the vehicle height direction, and may achieve a downsizing of the device as a whole.

Furthermore, according to the aforementioned embodiment, the second end sides of the first and second cables 21 and 22 are connected to the cable holder 18 that is fixed to the lower roller supporting member 6 by means of the first and second springs 24 and 25 whose respective one ends engage with respective guide pins 23. Thus, the second end sides of the first cable 21 and the second cable 22 are connected to the cable holder 18 in such a manner that vertical positions of the second end sides of the first cable 21 and the second cable 22 are different from each other in response to the vertical positions of the respective guide pins 23. The pulley cover 15 may smoothly guide the second end sides of the first and second cables 21 and 22 to be in contact with the idle pulley 14 via different vertical positions each other. Further, by fixing to the lower roller supporting member 6 the cable holder 18, in which the second end sides of the first and second cables 21 and 22 that are fixed to the respective guide pins 23, and the first and second springs 24 and 25 are accommodated beforehand, so that the cable holder 18 and the lower roller supporting member 6 are combined with each other, the assembly operation to the sliding door 4 may be facilitated.

Furthermore, according to the aforementioned embodiment, the center pulley 14*c* with which the first cable 21 is in contact, and the upper pulley 14*b* and the lower pulley 14*d* with which the first and second cables 21 and 22 are in contact respectively overlap each other in the vehicle height direction and formed individually. Thus, draw-out or take-up of the first cable 21 or the second cable 22 may be smoothly performed by the idle pulley 14.

Furthermore, according to the aforementioned embodiment, the first cable 21 in contact with the center pulley 14*c* is covered by the cover portion 15*c*. Thus, even if the second end side of the first cable 21 or the second cable 22 swings significantly, the first cable 21 or the second cable 22 may be prevented from directly interfering with the first cable 21 in contact with the center pulley 14*c*.

Furthermore, according to the aforementioned embodiment, the cover portion 15*c* is formed as a part of the guide portions 15*a* and 15*b*. Thus, the pulley cover 15 may be downsized as a whole as compared to a case in which the cover portion 15*c*, and the guide portions 15*a* and 15*b* are formed and arranged separately.

Furthermore, according to the aforementioned embodiment, the first and second cables 21 and 22 are in contact with the pulleys 12, 13, 14, and 17 over entire length of the first and second cables 21 and 22 except for the respective second ends to which the lower roller supporting member 6 is connected. Thus, sliding resistance generated at a time of draw-out and take-up of the first cable 21 or the second cable 22 may be minimized. A driving force for opening and closing the sliding door 4 may be reduced.

The aforementioned embodiments may be changed as follows. The first and second cables 21 and 22 may be constituted by a single continuous cable. For example, a middle portion of the cable is wound around the cable take-up pulley 17 and made contact with the idle pulley 14, the first and second driven pulleys 12 and 13 while one end and the other end of the cable are connected to the lower roller supporting member 6 by means of respective springs. A single spring, not two springs, may be provided for one end and the other end of the cable. Even in this case, the pulley cover 15 may guide a portion, i.e. the other end, of the cable connected to the lower roller supporting member 6 to be made contact with the idle pulley 14 in such a manner that vertical positions of the other end of the cable and a portion, i.e. one end, of the cable are different from each other.

The case 26 accommodating therein the cable holder 18 may be formed as a unit with the bracket 7 of the lower roller supporting member 6. In addition, the respective second ends of the first and second cables 21 and 22 may be connected to the lower roller supporting member 6 by means of the first and second springs 24 and 25 respectively without providing the cable holder 18.

The lower rail 3, the first and second driven pulleys 12 and 13, the idle pulley 14, the drive motor 16, the pulley cover 15 may be directly supported on the lower portion of the vehicle 1 without providing the step panel 2.

According to the aforementioned embodiment, the guide rail is not limited to the lower rail 3 fixed to the lower potion of the vehicle 1. For example, the guide rail may be a center rail fixed so as to extend to the rear end of the vehicle 1 from a middle-step portion on a rear edge of the door opening 1*a*. In this case, the first and second driven pulleys 12 and 13, the idle pulley 14, the drive motor 16, and the pulley cover 15 may be supported in appropriate positions respectively in a vehicle body in response to a position of the center rail.

According to the aforementioned embodiment, the second driven pulley 13, the upper pulley 14*b*, and the other end side of the second cable 22 made contact therewith are arranged in a higher position in the vehicle height direction than the first driven pulley 12, the lower pulley 14*d*, and the other end side of the first cable 21 made contact therewith. However, a positional relationship in the vehicle height direction may be specified vice versa.

Further, according to the aforementioned embodiment, the upper pulley 14*b*, the center pulley 14*c*, and the lower pulley 14*d* of the idle pulley 14 are individually and rotatably formed so as to overlap each other in the vehicle height direction. However, the idle pulley 14 may be constituted by a single pulley including three annular grooves arranged at the same vertical positions as those of the upper pulley 14*b*, the center pulley 14*c*, and the lower pulley 14*d* respectively. Alternatively, the idle pulley 14 may be constituted by a pulley including a single annular grove having a plane corresponding to a range of vertical positions of the upper pulley 14*b*, the center pulley 14*c*, and the lower pulley 14*d* respectively. Even by such a pulley, the second end sides of the first and second cables 21 and 22 connected to the lower roller supporting member 6 are guided to the idle pulley by the pulley cover 15 so as to be made contact with the idle pulley in such a manner that vertical positions of the second end sides of the first cable and the second cable 21 and 22, and the first end side of the first cable 21 in contact with the idle pulley are different from one another.

According to the aforementioned embodiment, the height direction of the vehicle 1 is not limited to an accurate vertical direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle door opening and closing device comprising: a guide rail fixed to a vehicle body and whose front end portion bends via a bent portion towards an inner side in a width direction of a vehicle while whose rear end portion extends in a rearward direction of the vehicle; a supporting member connected to a vehicle door and guided by the guide rail for opening and closing the vehicle door; a first driven pulley, a second driven pulley, and an idle pulley arranged in the vicinity of the front end portion, the rear end portion, and the bent portion of the guide rail respectively, and rotatably supported on the vehicle body; a cable take-up pulley arranged between the idle pulley and the second driven pulley, and rotatably driven by a driving member fixed to the vehicle body; a cable wound around the cable take-up pulley and made contact with the idle pulley, the first driven pulley, and the second driven pulley; the cable being connected to the supporting member by means of a spring; and a pulley cover for guiding a first portion of the cable connected to the supporting member to be made contact with the idle pulley in such a manner that a vertical position of the first portion of the cable is different from that of a second portion of the cable in contact with the idle pulley.

2. The vehicle door opening and closing device according to claim 1, wherein the cable includes a first cable whose first end side is wound around the cable take-up pulley while a second end side is connected to the supporting member by means of a first spring and made in contact with the idle pulley and the first driven pulley, and a second cable whose first end side is wound around the cable take-up pulley while a second end side is connected to the supporting member by means of a second spring and made in contact with the second driven pulley.

3. The vehicle door opening and closing device according to claim , wherein the guide rail, the first driven pulley, the second driven pulley, the idle pulley, the driving member, and the pulley cover are supported on a step panel fixed to a lower portion of the vehicle.

4. The vehicle door opening and closing device according to claim 1, wherein the cable take-up pulley is positioned such that a rotational axis thereof extends in the width direction of the vehicle.

5. The vehicle door opening and closing device according to claim 2, further comprising: a cable holder fixed to the supporting member; and a pair of core members accommodated in the cable holder in such a manner that vertical positions of the core members are different from each other and to which the second end sides of the first cable and the second cable are fixed respectively; wherein the first spring and the second spring are accommodated in the cable holder such that one ends of the first spring and the second spring engage with the pair of core members respectively, and other ends of the first spring and the second spring engage with an inner wall face of the cable holder.

6. The vehicle door opening and closing device according to claim 2, wherein the idle pulley includes a center pulley with which the first cable is in contact, an upper pulley arranged on an upper side of the center pulley and with which one of the second end sides of the first cable and the second cable is in contact, and a lower pulley arranged on a lower side of the center pulley and with which the other one of the second end sides of the first cable and the second cable is in contact.

7. The vehicle door opening and closing device according to claim 5, wherein the idle pulley includes a center pulley with which the first cable is in contact, an upper pulley arranged on an upper side of the center pulley and with which one of the second end sides of the first cable and the second cable is in contact, and a lower pulley arranged on a lower side of the center pulley and with which the other one of the second end sides of the first cable and the second cable is in contact.

8. The vehicle door opening and closing device according to claim 6, wherein the pulley cover includes a guide portion for guiding one of the second end sides of the first cable and the second cable, and the other one of the second end sides of the first cable and the second cable to be made contact with the upper pulley and the lower pulley respectively.

9. The vehicle door opening and closing device according to claim 6, wherein the pulley cover includes a cover portion for covering the first cable in contact with the center pulley.

10. The vehicle door opening and closing device according to claim 6, wherein the cover portion is formed as a part of the guide portion.

* * * * *